US009829568B2

(12) United States Patent
Woodsum

(10) Patent No.: US 9,829,568 B2
(45) Date of Patent: Nov. 28, 2017

(54) RADAR USING HERMETIC TRANSFORMS

(71) Applicant: VertoCOMM, Inc., Weston, MA (US)

(72) Inventor: Harvey C. Woodsum, Bedford, NH (US)

(73) Assignee: VertoCOMM, Inc., Weston, MA (US)

( * ) Notice: Subject to any disclaimer, the term of this patent is extended or adjusted under 35 U.S.C. 154(b) by 179 days.

(21) Appl. No.: 14/551,993

(22) Filed: Nov. 24, 2014

(65) Prior Publication Data

US 2015/0145716 A1 May 28, 2015

Related U.S. Application Data

(60) Provisional application No. 61/907,715, filed on Nov. 22, 2013.

(51) Int. Cl.

| | |
|---|---|
| ***G01S 13/08*** | (2006.01) |
| ***G01S 7/292*** | (2006.01) |
| ***G01S 3/74*** | (2006.01) |
| ***G01S 5/04*** | (2006.01) |
| ***G01S 7/41*** | (2006.01) |
| ***G01S 13/42*** | (2006.01) |
| *G01S 13/00* | (2006.01) |
| *G01S 13/28* | (2006.01) |
| *G01S 13/524* | (2006.01) |
| *G01S 13/02* | (2006.01) |

(52) U.S. Cl.

CPC ................ *G01S 7/292* (2013.01); *G01S 3/74* (2013.01); *G01S 5/04* (2013.01); *G01S 7/411* (2013.01); *G01S 7/415* (2013.01); *G01S 13/42* (2013.01); *G01S 13/003* (2013.01); *G01S 13/28* (2013.01); *G01S 13/524* (2013.01); *G01S 2013/0245* (2013.01)

(58) Field of Classification Search

CPC .................................. G01S 7/292; G01S 3/74
USPC ................................................ 342/146, 377
See application file for complete search history.

(56) References Cited

U.S. PATENT DOCUMENTS

| | | |
|---|---|---|
| 4,338,605 A | 7/1982 | Mims |
| 4,989,090 A | 1/1991 | Campbell et al. |
| 5,479,176 A | 12/1995 | Zavrel, Jr. |
| 5,583,884 A | 12/1996 | Maruyama et al. |

(Continued)

FOREIGN PATENT DOCUMENTS

CN 103153330 A 6/2013

OTHER PUBLICATIONS

International Search Report and Written Opinion issued by the U.S. Patent and Trademark Office as International Searching Authority for International Application No. PCT/US14/67148 dated Jul. 31, 2015 (11 pgs.).

(Continued)

*Primary Examiner* — Marcus Windrich

(74) *Attorney, Agent, or Firm* — Wilmer Cutler Pickering Hale and Dorr LLP

(57) ABSTRACT

The systems and methods use Hermetic Transform processing to achieve higher resolution in space, time, and frequency measurements, leading to enhanced object detection, localization, and classification, and can improve several aspects of RADAR, including: phased-array beamforming, Doppler filter processing, pulse compression/replica correlation, and in the creation of higher resolution ambiguity function measurements for both multi-static active and passive RADAR.

17 Claims, 8 Drawing Sheets

(56) References Cited

U.S. PATENT DOCUMENTS 5,892,847 A 4/1999 Johnson
5,933,537 A 8/1999 Hajjahmad et al.
6,101,399 A 8/2000 Raleigh et al.
6,185,440 B1 2/2001 Barratt et al.
6,229,486 B1 5/2001 Krile
6,317,612 B1 11/2001 Farsakh
6,408,109 B1 6/2002 Silver et al.
6,421,007 B1 7/2002 Owen et al.
6,427,531 B1 8/2002 Chintawongvanich
6,876,693 B2 4/2005 Sim et al.
6,943,732 B2 9/2005 Gottl et al.
6,947,470 B2 9/2005 Berens et al.
7,012,978 B2 3/2006 Talwar
7,065,070 B1 6/2006 Chang
7,092,690 B2 8/2006 Zancewicz
7,103,537 B2 9/2006 Witzgall et al.
7,106,785 B2 9/2006 Yoshida et al.
7,260,370 B2 8/2007 Wang et al.
7,280,627 B2 10/2007 Orlin
7,298,805 B2 11/2007 Walton et al.
7,415,711 B2 8/2008 Chew et al.
7,443,942 B2 10/2008 Kouyama
7,450,067 B2 11/2008 Xin
7,873,016 B2 1/2011 Kim
7,925,234 B2 4/2011 Yeh et al.
8,005,162 B2 8/2011 Cai et al.
8,036,287 B2 10/2011 Hwang et al.
8,064,408 B2 * 11/2011 Woodsum .............. H04B 7/086 370/334
8,363,704 B1 1/2013 Rayburn
8,433,804 B2 4/2013 Swanburg et al.
8,559,456 B2 10/2013 Woodsum
8,917,786 B1 12/2014 von der Embse
8,948,718 B2 2/2015 Woodsum
9,154,214 B2 10/2015 Woodsum
9,154,353 B2 10/2015 Woodsum
2002/0034215 A1 3/2002 Inoue et al.
2003/0039303 A1 2/2003 Sriram
2003/0216156 A1 11/2003 Chun
2004/0071200 A1 4/2004 Betz et al.
2004/0095990 A1 5/2004 Gossett et al.
2004/0120429 A1 6/2004 Orlin
2005/0101253 A1 5/2005 Pajukoski et al.
2005/0128937 A1 * 6/2005 Akopian ................. G01S 19/29 370/210
2005/0141545 A1 6/2005 Fein et al.
2005/0200515 A1 9/2005 Cherniakov
2005/0271016 A1 12/2005 Kim et al.
2006/0013332 A1 1/2006 Rayburn
2006/0030364 A1 2/2006 Olesen et al.
2006/0053005 A1 3/2006 Gulati
2006/0244660 A1 11/2006 Ann et al.
2007/0001897 A1 * 1/2007 Alland .................... G01S 7/288 342/70
2007/0164902 A1 * 7/2007 Bang ...................... H04B 7/086 342/377
2007/0189362 A1 8/2007 D'Amico et al.
2007/0213013 A1 9/2007 Kim
2008/0129584 A1 * 6/2008 Antonik .................. G01S 13/28 342/25 B
2008/0260066 A1 10/2008 Cai et al.
2008/0317172 A1 12/2008 Zhang et al.
2009/0237294 A1 9/2009 Shoji et al.
2009/0239551 A1 9/2009 Woodsum
2010/0178057 A1 7/2010 Shieh
2010/0254325 A1 10/2010 Narasimhan et al.
2010/0272005 A1 10/2010 Larsson et al.
2010/0303182 A1 12/2010 Daneshrad et al.
2011/0187702 A1 8/2011 Schwartz
2011/0188597 A1 8/2011 Agee et al.
2011/0288823 A1 11/2011 Gupta
2012/0027111 A1 2/2012 Vook et al.
2012/0064916 A1 * 3/2012 Woodsum .............. H04B 7/086 455/456.1
2012/0188058 A1 7/2012 Lee et al.
2012/0212371 A1 8/2012 Chang
2012/0262328 A1 10/2012 Shinonaga et al.
2013/0116561 A1 * 5/2013 Rothberg ............. A61B 8/4254 600/438
2013/0252568 A1 9/2013 Woodsum
2013/0344909 A1 12/2013 Davydov et al.
2015/0145716 A1 5/2015 Woodsum

OTHER PUBLICATIONS

Koch, et al., "Increased Capacity per Unit-Cost by Oversampling," ARXIV. Org. Cornell Univ. Library, 201 Olin Library, Cornell University, Ithaca, NY, 27 pgs. (Aug. 31, 2010).

Pinchon, et al., "A Design Technique for Oversampled Modulated Filter Banks and OFDM/QAM Modulations," In: Lecture Notes in Computer Science, Springer. Heidelberg, Berlin, 10 pgs. (Jan. 1, 2014).

Woodsum, C.M. and Woodsum, H.C., "Optimization of Cascaded Hermetic Transform Processing Architectures via a Chimerical Hybrid Genetic Algorithm," Proceedings of the Sixteenth International Conference on Cognitive and Neural Systems (ICCNS), Boston University, May 30-Jun. 1, 2012 1 page.

Zhang, et al., "An Oversampled Filter Bank Multicarrier System for Cognitive Radio," Personal, Indoor and Mobile Radio Communications, 2008. PIMRC 2008. IEEE 19th International Symposium on, IEEE. Piscataway, NJ, USA, p. 1-5 (Sep. 15, 2008).

International Search Report and Written Opinion issued by the U.S. Patent and Trademark Office as International Searching Authority for International Application No. PCT/US14/62211 dated Feb. 3, 2015 (8 pgs.).

International Search Report and Written Opinion issued by the U.S. Patent and Trademark Office for International Application No. PCT/US13/29613 dated May 8, 2013 (8 pgs.).

International Search Report and Written Opinion issued by the U.S. Patent and Trademark Office for International Application No. PCT/US09/034264 dated Apr. 23, 2009 (11 pgs.).

International Search Report and Written Opinion issued by the U.S. Patent and Trademark Office for International Application No. PCT/US13/53422 dated Oct. 4, 2013 (7 pgs.).

Doblinger, G. "Beamforming with Optimized Interpolated Microphone Arrays," IEEE HSCMA Conference Proceedings, pp. 33-36 (2008).

Gabel and Roberts,"Signals and Linear Systems", 2nd Edition, John Wiley & Sons, New York, pp. 327-332, 345 (1980) (Total 9 pgs.).

Goshi, et al., "A Compact Digital Beamforming SMILE Array for Mobile Communications", IEEE Transactions on Microwave Theory and Techniques, vol. 52, No. 12 (Dec. 2004) 2732-2738 (7 pgs.).

Monzingo and Miller, "Introduction to Adaptive Arrays", John Wiley & Sons, p. 274 (1980) 217-292 (Total 78 pgs.).

Rao, C.R., "Estimation of Variance and Covariance Components in Linear Models," J. Stat. Assoc., Issue 337, Mar. 1972, pp. 112-115; Published online Apr. 5, 2012.

* cited by examiner

RADAR USING HERMETIC TRANSFORMS

CROSS-REFERENCE

This application claims priority under §119(e) to provisional application 61/907,715, filed Nov. 22, 2013, which is incorporated by reference.

FIELD OF THE INVENTION

This disclosure relates to the field of RADAR, and to other forms of object detection and location systems which derive from the principles of RADAR (such as SONAR, SODAR, LIDAR, and Medical Ultrasonography).

BACKGROUND OF THE INVENTION

Referring to FIG. 1, a purpose of RADAR is to accomplish detection, localization, and potentially classification of objects remotely. In active RADAR, a wave of electromagnetic energy 2 is launched from a transmission source 1*a* which derives the signals to be carried by the wave 1*b* from a RADAR Signal Processor 7. The transmitted wave propagates to the object (the "target") 3 and is reflected or scattered by the object, returning an echo wave 4 to the RADAR Receiver 5. The receiver may, but need not, be co-located with the point of transmission.

Assume an initial wavelength of the transmitted wave to be $\lambda_0$. Due to the well-known Doppler Effect, the wavelength is altered due to relative motion along a line between source and target, and by relative motion along a line between the target and the receiver 5 so that it will be received with a potentially different wavelength ($\lambda$). Due to the invariance of the speed of electromagnetic propagation (discounting for the moment the slight effect of index of refraction in a medium, such as air, which we assume to be very close to unity), the frequency of the wave is therefore altered. This alteration is referred to as the "Doppler Frequency Shift". By determining the Doppler Frequency Shift present in received signal 6, the relative motion of the target may be inferred. In addition, the finite speed of light c, causes an observable time delay to be present in receiving the echo from target, which allows distance to the target to also be inferred. The processing needed to accomplish the measurements of time delay and frequency shift (and therefore range and range rate to the target) are accomplished in a RADAR Signal Processor 7.

A target may include multiple scatterers (e.g., a flock of migrating birds, weather features, etc.) creating multiple range and Doppler returns, which can be interpreted to allow additional classification of the target. Results of these measurements are supplied to an information processor and display subsystem 8 which assimilates the signal processor measurements, and interprets and displays the results in a useful form.

Localization of the target, even to the point where target imaging is possible, is important to RADAR. In current RADAR systems, it is often the case that the transmission and reception antennas use multiple elements that can be processed with phased-array (beam-forming) techniques to gain resolution in angle so that this can be accomplished. Synthetic Aperture RADARs and Inverse Synthetic Aperture RADARs makes use of relative motion to create longer apertures "synthetically" through processing of the coherent signal returns. The discussion above can be generalized for the case where the electromagnetic wave is in the infra-red or optical band of the EM spectrum (or even higher in frequency). For example, the optical case is termed LIDAR (Light (Wave) Detection and Ranging vs. Radio (Wave) Detection and Ranging). For the case where the wave utilized is non-electromagnetic, e.g. acoustic, the systems are referred to as SONAR (Sound Navigation and Ranging), SODAR (Sound Detection and Ranging), or Medical Ultrasonic Echo-Ranging/Ultrasonography. The disclosure here applies to all such generalized cases of the particular RADAR examples presented here.

The present disclosure applies as well to what is termed "passive" radar, where the object (target) carries a RADAR signal source and therefore only RADAR receivers are required (all transmitters are external to the device). FIG. 2 shows the passive radar concept.

DESCRIPTION OF THE INVENTION

This disclosure includes application of the Hermetic Transform disclosed in U.S. Pat. No. 8,064,408 (issued Nov. 22, 2009), and U.S. Pat. No. 8,559,456 (issued Oct. 15, 20013), each of which is expressly incorporated herein for all purposes, to aspects of the RADAR signal processing problem in order to provide improved time, Doppler, and angle determination, as well to enhanced time, Doppler, and angle filtering (beamforming) to improve signal-to-noise ratio (SNR). The incorporated patent also identifies structures (processors, memory, etc.) that can be used to implement such systems.

The systems and methods described here improve upon these systems through the use of Hermetic Transform processing to achieve higher resolution in space, time, and frequency measurements, leading to enhanced object detection, localization, and classification. The present disclosure improves upon several aspects of RADAR, including: phased-array beam-forming (phased-array RADAR), Doppler filter processing (Doppler and moving target indicator (MTI) RADAR), pulse compression/replica correlation (pulse-compression or spread-spectrum RADAR, and synthetic-aperture RADAR), and in creation of higher resolution ambiguity function measurements (for both multi-static active and passive RADAR). Throughout this disclosure, the RADAR shall be taken to mean RADAR and all other similar devices or systems which make use of the same principles of operation and construction.

The disclosure makes use of the (discrete) Hermetic Transform, as described in the referenced and incorporated patents. The Discrete Hermetic Transform is analogous to a Discrete Fourier (as well as the "Fast Fourier") Transform, but is designed to accomplish higher analysis resolution for whatever domain it is applied to, whether space, frequency, or time.

Figure 3:
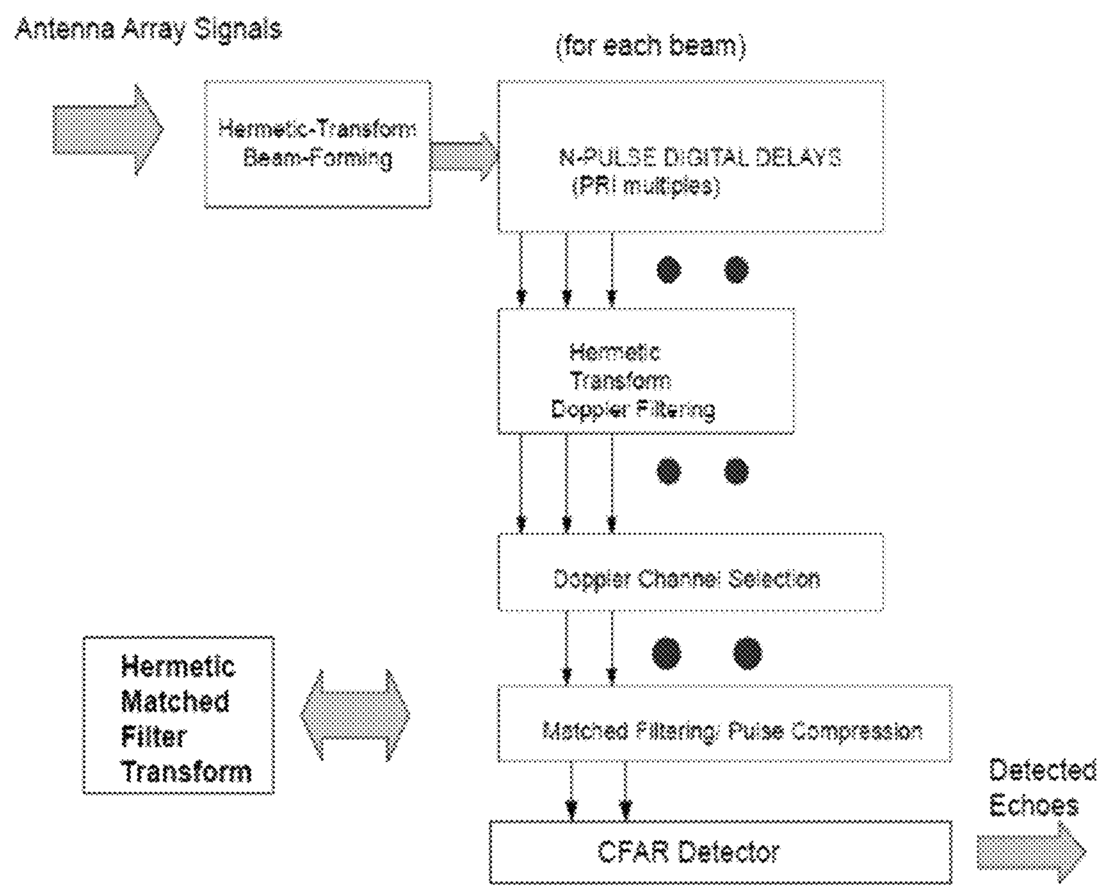
FIGS. 3-6 are block diagrams of systems described herein.

Referring to FIG. 3, a generic block diagram is indicated for processing RADAR RF signals from a plurality of antennas in an antenna array, and for a plurality of RADAR pulses, in order to show where the Hermetic Transform is or can be used. First, signals from a plurality of antenna elements, forming an array, are provided to a Hermetic Transform beamforming device (or in the case of digitized antenna signals, this could be a computing device which executes a Hermetic Transform beamforming algorithm) in order to produce a set of beam-formed signal-data channels. The application of Hermetic Transforms to beamforming is taught in more detail in the incorporated patents.

For convenience, it is assumed the antenna data is received with RF circuitry, quadrature sampled in a demodulator, digitized in an analog-to-digital converter, and multiplexed into a serial bit stream of complex samples. The samples are time aligned with a corner-turn memory (which reads in sampled data that changes over time into rows and reads out the data in columns to provide multiple samples received at the same time), or equivalent process into a set of vector time "snapshots". Each vector snapshot thus includes a set of complex samples at the same sampling instant (to the precision of the system clock) from each element in the array. In order for this to be the case, each receiver synchronously samples, and a stable local oscillator for downconversion is shared or coherent between antenna receiver channels.

Each beam is formed using a Hermetic Transform, which applies a complex Hermetic beamforming matrix to each vector "snapshot" in order to produce the set of complex time samples from each beam. Each single sample from a particular beam is formed by matrix-multiplying a row vector of the Hermetic (beamforming) Transform, times a column vector formed with synchronously obtained time samples (a "snapshot") to produce a single complex (beam) time sample. The sample corresponds to a particular beam direction, which is associated with the particular row vector selected. Some or all of the directions (rows) in the Hermetic Beamforming Transform may be selected. For the case of a spatially oversampled array (array inter-element spacing much less than ½ wavelength) the Hermetic Transform will produce beams much narrower in angular extent that would be produced with application of a conventional beamforming matrix (FFT or Butler Matrix). The Hermetic (beamforming) Transform is constructed from the array manifold in such a fashion as to create beams that are as ideally close to a spatial delta function as possible, in a minimum quadratic norm sense. A typical advantage is 8:1 in beam resolution (beams are 8× as narrow).

Figure 4:
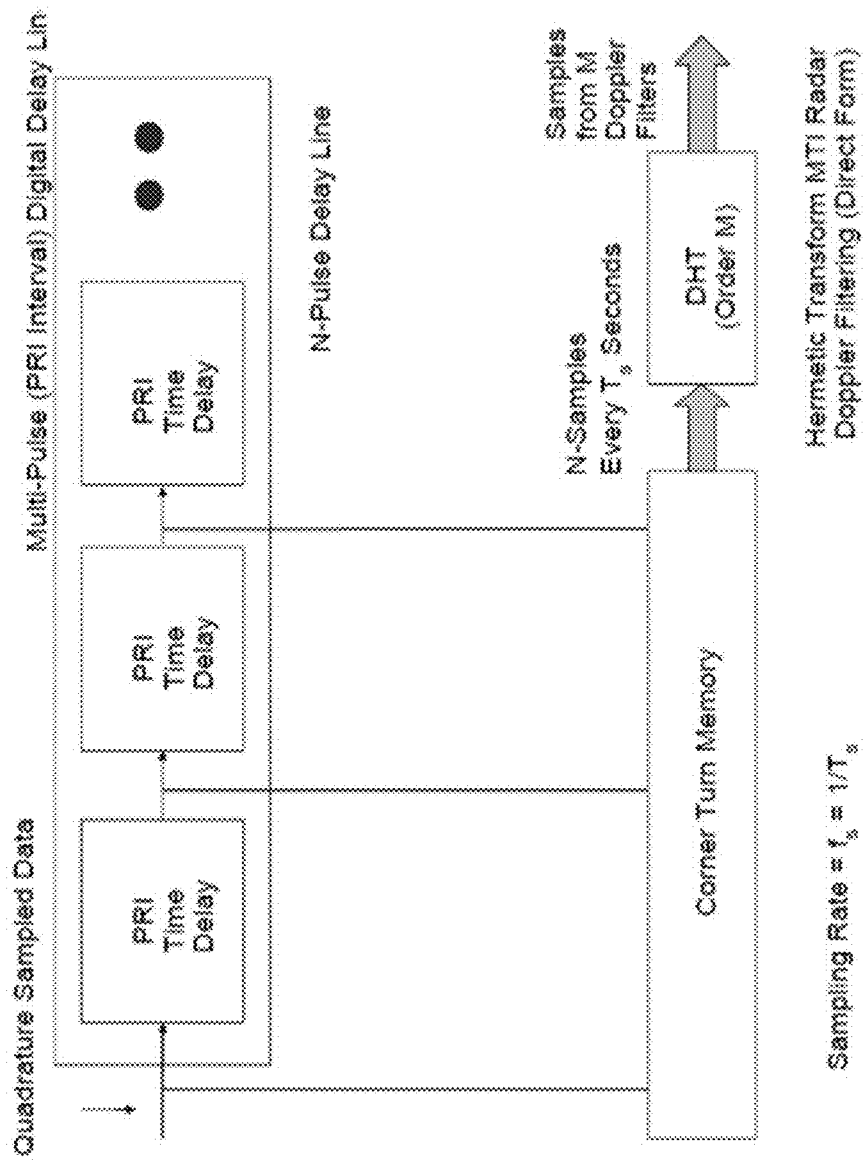

Referring to FIG. 4, for the case of a pulse Doppler or MTI RADAR, each stream of beam samples thus created is fed to an N-tap, tapped delay line, where the time spacing between taps is one pulse repetition interval (PRI). For the case of passive radar, where the signal may or not be pulsed, regular pulse intervals may be selected in any fashion consistent with sampling requirements. Data from each tap location is fed (as shown) to a Doppler processing stage, where a corner turn memory or equivalent is used to align each of N samples that are PRI intervals apart, into vector "Doppler Snapshots". At this point, a Hermetic Frequency Analysis (Doppler) Transform Matrix of order M is applied, to the snapshots in order to create a set of Doppler frequency filters. By analogy, if the pulse-repetition frequency (the reciprocal of the pulse repetition interval) is much higher than the Nyquist rate for the Doppler shifts involved, the Hermetic Transform will have a much higher resolution in Doppler space than would a conventional Doppler processing algorithm (DFT/FFT), with a typical 8:1 enhancement (doppler bins are 8× as narrow).

A set of Doppler-filtered signal streams are produced through this process. Each Doppler filter corresponds to a row of the Hermetic Doppler Transform Matrix. For the case of acoustic radar, it is often the case the Doppler filtering (transform) may be applied to each pulse with the N-pulse delay line being unnecessary.

Alternatively, an MTI filter can be constructed for clutter Doppler rejection, through a three step process. This process includes: (1) applying the Hermetic Doppler Transform to the Doppler Snapshot Vectors, in order to transform to the Doppler Frequency Domain; (2) applying a filter matrix in the Doppler Frequency Domain; and (3) applying the Pseudo-Inverse of the Hermetic Doppler Transform to the result. This would be equivalent to a conventional N-pulse canceller processing stage, except that a more narrow and precise clutter "notch" in the Doppler domain can be obtained through the utilization of the Hermetic Transform. The diagram immediately below indicates the required processing as described above.

Figure 6:
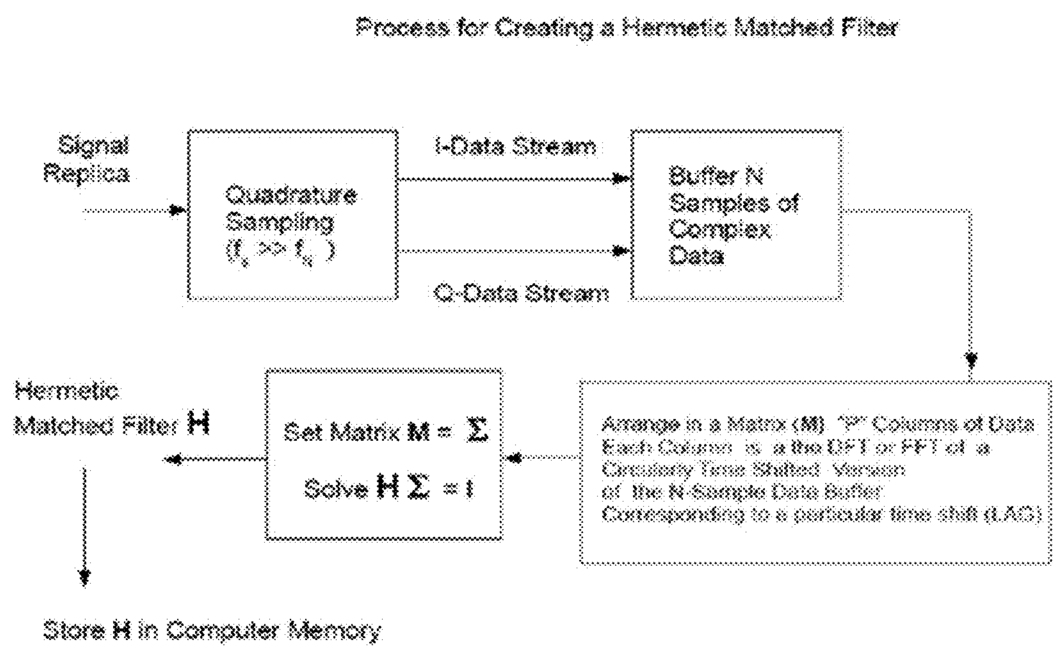

Referring to FIG. 6, which shows the process for creating a hermetic matched filter matrix, the output of each Doppler Filter stream is match-filtered using either conventional replica correlation or Hermetic transform match filter processing. For the case where the signal is time sampled at a rate much higher than the information bandwidth of the signal (which typically is a pseudorandom noise (PN) coded signal, like spread spectrum, a significant time resolution advantage accrues from the use of the Hermetic Transform.

Figure 5:
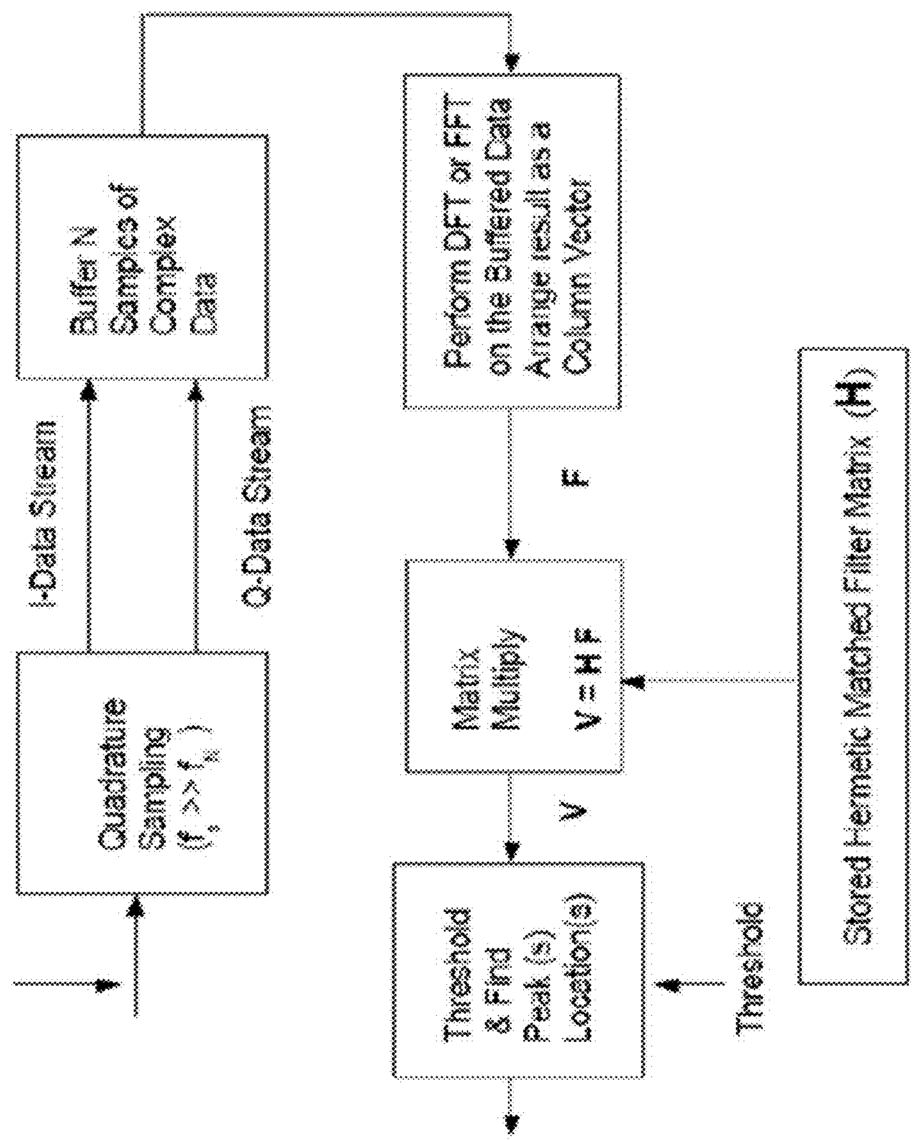

FIG. 5 indicates the matched filter process. The output of each beamformed, Doppler-filtered, match-filtered data stream is processed with a threshold, usually a constant false alarm rate (CFAR) version, to detect the beam (angle, elevation and bearing), Doppler shift (range-rate), and time (range), of the target. A fine-grained analysis of the Doppler shift and range distribution of the target can be potentially utilized for target classification. Subsequent stages of processing (not shown) can provide precise tracking of the target as well, and precise target motion analysis can also be analyzed via the Hermetic Transform to produce additional information about the target characteristics. This is particularly true in the case of weather radar, where wind orbital and gusting characteristics may be identified with such a procedure.

The process for applying a Hermetic (Transform) Matched Filter is somewhat analogous to the method for accomplishing replica correlation matched filtering in ordinary RADAR. In the latter case, a block of signal is transformed using a DFT/FFT, then multiplied by the complex conjugate of the Fourier transform of the signal replica, then processed with the inverse DFT/FFT.

A linear DFT/FFT/DHT transform (any one of these) is applied to circularly shifted copies of the replica, and these are arranged as a set of column vectors to form a matrix M. The equations shown in FIG. 6 are solved to find a matrix, H, the Hermetic (Transform) Matched Filter. The H matrix is applied to the corresponding DFT/FFT/DHT of a data block to find the Hermetic Matched Filter of the data. Each row of the transform matrix H corresponds to a different time lag (time delay) so that a precise time of arrival, and thus the range, of the target echo(s) can be determined. Equivalently, a two-dimensional version of this process can be applied, using both time-shifted and time-scaled/frequency shifted (Doppler-adjusted) versions of the signal replica, in order to create a time-frequency matched filter analogous to a conventional ambiguity function. The Hermetic (Transform) ambiguity function will produce higher frequency resolution when the PRI is much greater than Nyquist in the Doppler space, and will produce much higher time resolution when the signal is oversampled in time, as compared to Nyquist relative to the information bandwidth of the replica. In the case of the multi-static active RADAR, it is typical to point beam(s) at the illumination sources, e.g., a weather radar, or cellular telephone network tower/base station, and to create a set of search beams around the space of interest to produce the replica (beam pointing at sources), and the target echo signals (beams pointed in search directions). Both the ambiguity function processing and more conventional RADAR processing will work in this case.

Figure 7:
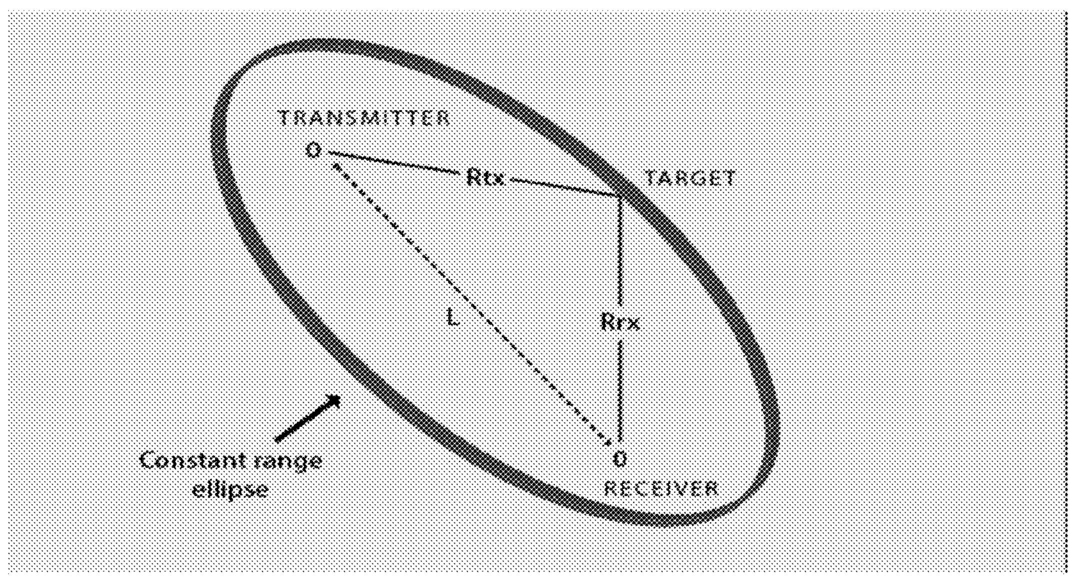
FIG. 7 demonstrates operation of RADAR.

Referring to FIG. 7, for the case of multi-static RADAR processing, the range estimate from a single measurement lies along the locus of an ellipse as shown below. The precise target location will derive from multiple range and Doppler measurements. Each of the stages of Hermetic Transform processing stages (to measure angle/range-rate/range) can produce approximately order-of-magnitude improvement in spatial/frequency/time resolution. Specific performance for specific illumination sources can be calculated using the signal parameters involved. For example if the multi-static illuminator is taken to be a WSR-88D Weather RADAR, which is specified according to the parameter set shown below, we can calculate the estimated system performance characteristics readily.

Important parameters include the peak power (1 MW) and the PRF, which is sufficient to support unambiguous Doppler of all but the highest speed targets, as well as the bandwidth of the radar pulse (~1 MHz). It has been reported in the literature that coding modulation on new variants of this radar support ~3 MHz bandwidth vice the lower bandwidth or earlier versions. Based on these parameters, the performance of a passive radar is estimated using this signal as follows:

Doppler Resolution (16 pulse transform):

1000 Hz/(160)~6 Hz (~0.7 M/Sec range rate resolution)

Range Resolution: ~10 meters/sqrt(SNR Power Ratio)~1 Meter

Other parameters are shown in Table I:

TABLE I

| WSR-88D Parameters | | |
|---|---|---|
| RF loss - two way | 0.6 dB at 2800 MHz | |
| Pestal | Elevation over azimuth | |
| | Azimuth | Elevation |
| Steerability | 360 | +0.5 to +19.5 |
| Rotational rate - maximum | 36 s^−1 | 36 deg/sec |
| Acceleration | 15 s^−2 | 15 deg/sec^2 |
| Noise temperature | 450 Kelvin | |
| Intermediate frequency | 57.6 MHz | |
| Band width, 3 dB | 0.63 MHz | |
| Gain (at 2800 MHz) | 45 dB | |
| Beam Width | 1 deg | |
| First Sidelobe level | −25 dB | |
| Transmitter and Receiver Subsystem | | |
| Coherent - Chain Design | | |
| Transmitter | | |
| Frequency Range | 2700 MHz to 3000 MHz | |
| Peak Power | 1 MW | |
| Pulse Widths | 1.57 microsec to 4.5 microsec | |
| rf duty cycle | 0.002 maximum | |
| PRFs | Short pulse: 318 Hz to 1403 Hz | |
| | Long Pulse: 318 Hz to 452 Hz | |
| Receiver | | |
| Dynamic range | 93 d | |

Figure 1:
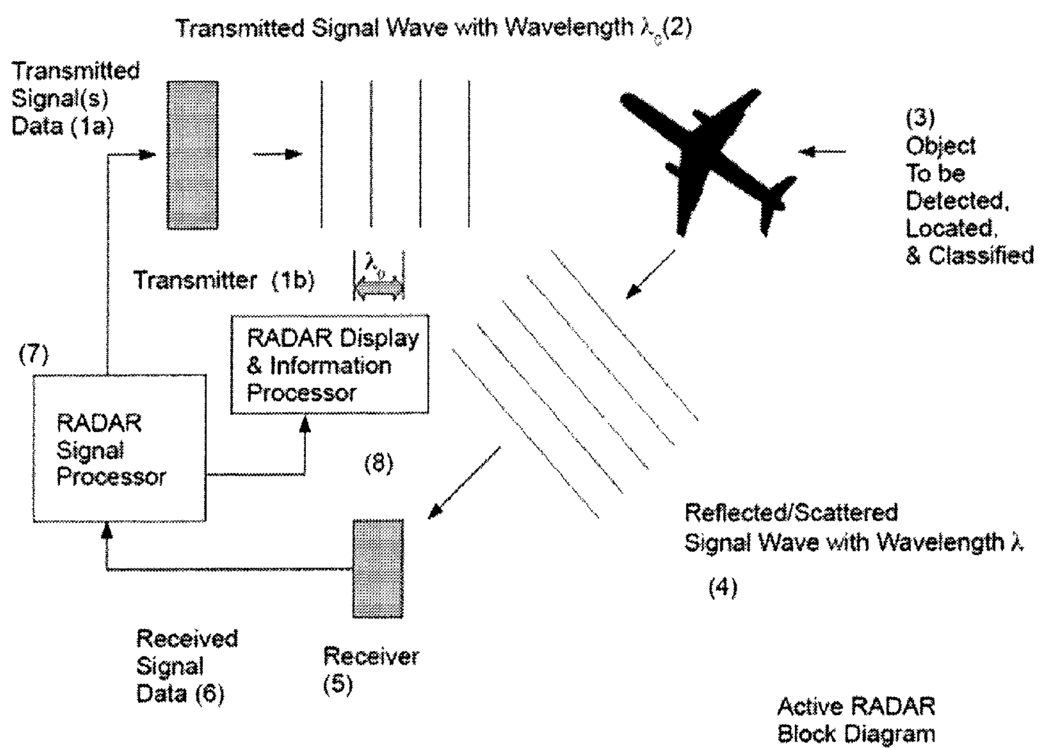
FIGS. 1 and 2 are block diagrams of known RADAR systems.
Figure 2:
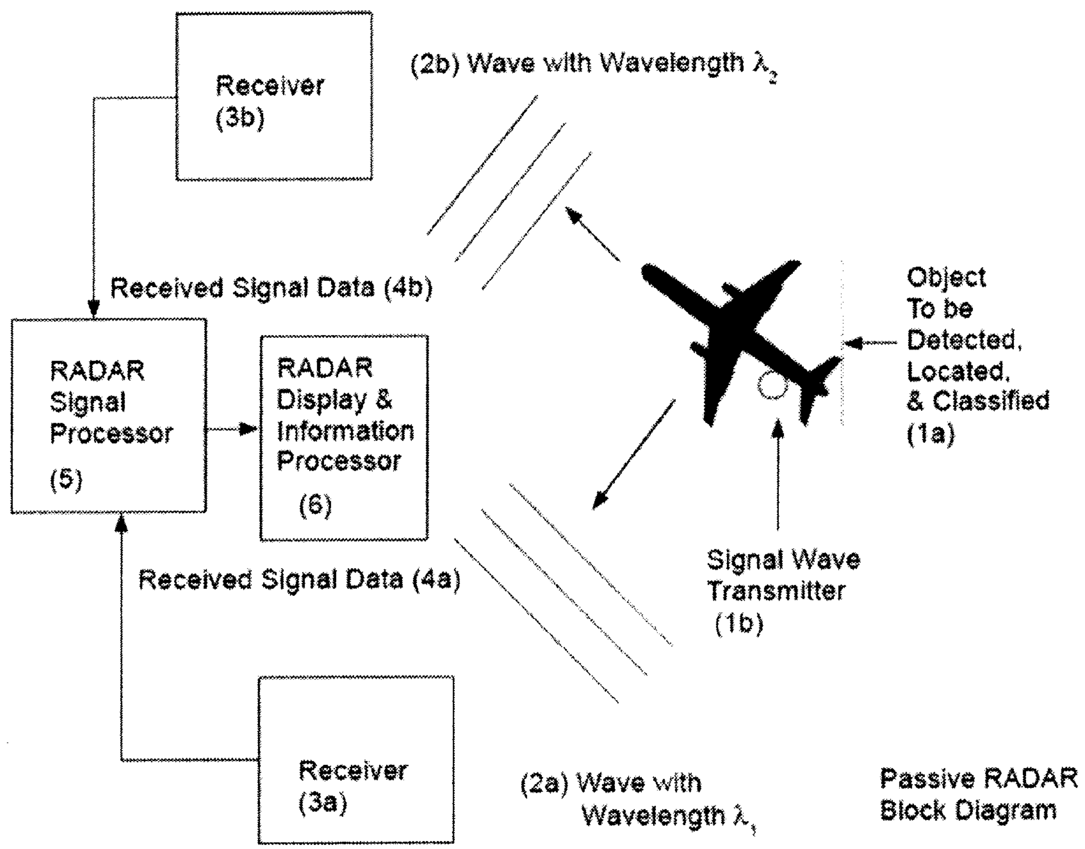

For the case of the passive RADAR as shown in FIG. 2, beams are pointed at a target emitter from various locations, and a cross ambiguity function is created between multiple listening stations to create a set of time-difference of arrival and relative Doppler determinations which are then fed to a localization algorithm.

The present disclosure also includes alternative orders of processing. This ordering as described is further useful in acoustic radar application (SONAR/SODAR/Medical Ultrasonography).

Figure 8:
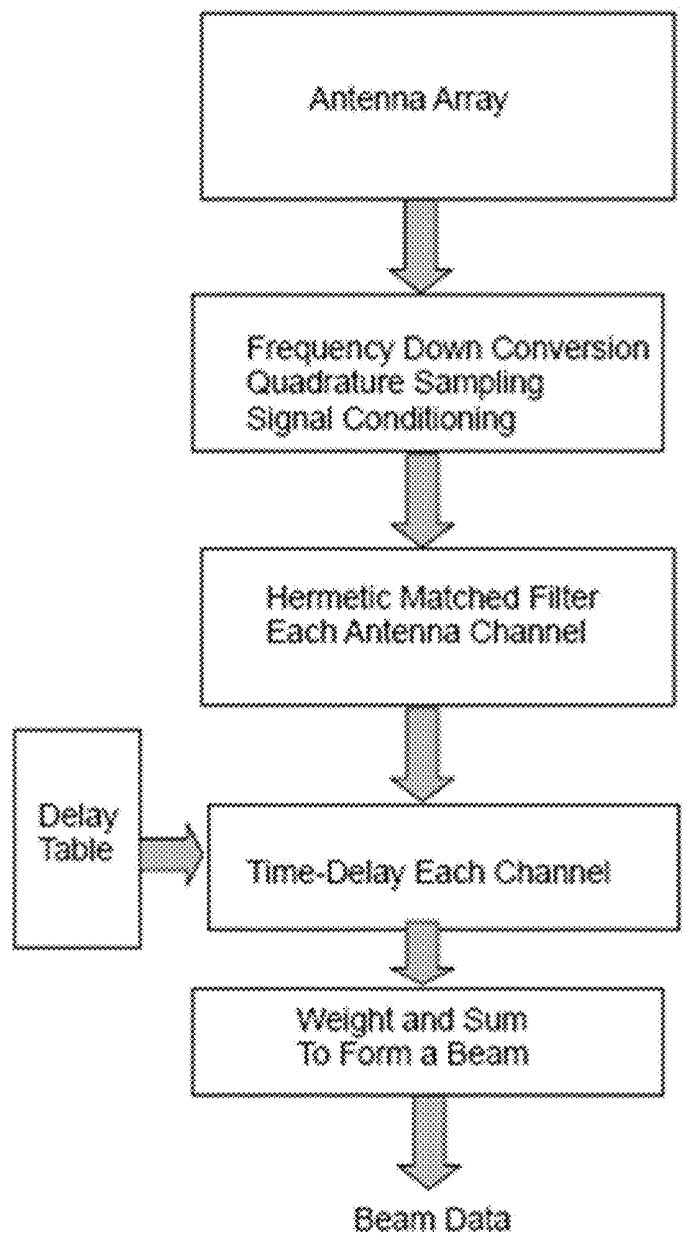
FIG. 8 is a flow chart.

Referring to FIG. 8, the diagram indicates a practical alternative form of Hermetic (Transform) beamforming, wherein the Hermetic Matched Filter, matched to the replica, can be implemented with a single row of the Hermetic Transform matched filter matrix utilized to process each antenna channel first. In terms of implementation, one embodiment is to first select one row of the Hermetic Matched Filter to make a Hermetic Vector and convolve this vector with a sliding Spectral Transform (Fourier or Hermetic) of each channel data stream. A Goertzel algorithm can be utilized for short-term Fourier/Hermetic Transform. Multiple Hermetic Matched Filters can also be applied in parallel, one for each Doppler cell, creating multiple Doppler-filtered streams for each element. The channels corresponding to a particular Hermetic Matched Replica are then combined using conventional beamforming, for example, a time delay beamformer as shown in the diagram. Each channel is weighted (e.g., with a Hanning Function) and time-delayed according to a time-delay table, prior to summation to form a beam. There is one set of weights and delays for each beam to be formed. The angular resolution is directly proportional to the array dimension and inversely proportional to the time resolution of the compressed (matched filtered) waveform as measured at the output of the Hermetic Matched Filter stage. For example, an 8:1 reduction in echo peak duration will produce an 8:1 radian angle resolution improvement. In an imaging RADAR/SONAR, this would translate into an 8×8 or 64 fold improvement in number of pixels in the RADAR/SONAR image, and an 8×8×8 resolution in a 3-D image. The above techniques also apply to synthetic aperture RADAR as well.

The present disclosure also provides an application for passive-radar type processing for Navigation Applications, such as in applications similar to the known Global Positioning System. A GPS receiver calculates its position by precisely timing the receipt of signals sent by GPS satellites in high orbit above the Earth. Each satellite continually transmits messages that include the time the message was transmitted as well as the satellite position at time of message transmission The receiver uses the messages it receives to determine the transit time of each message and computes a distance to each satellite using the speed of light. Each of these distances and satellites' locations defines a sphere, with the receiver being on the surface of each of these spheres. The distances and plurality of satellite locations are utilized to compute the location of the receiver employing particular navigation equations. In typical GPS operation, four or more satellites must be visible to obtain an accurate result, however, if one position variable is already known, a receiver can determine its position using only three satellites.

All satellites broadcast at the same frequencies. RF signals are encoded using different PN codes (like CDMA), a radar-like waveform utilized in a variety of communications systems. By using different PN codes, messages from individual satellites can be distinguished from each other based on the unique encodings for each satellite, which the receiver would be aware of.

Because all of the satellite signals are modulated onto the same L1 Band carrier frequency, the signals are separated after demodulation. This is done by assigning each satellite a unique binary sequence (Gold Code). Cross-correlation type processing can be utilized in order to estimate time of arrival of each signal from each GPS satellite. Here use of the Hermetic Transform Matched Filter can allow order of magnitude reduction in the time of flight measurement error with respect to each satellite, and therefore, an order of magnitude increase in accuracy in calculating the receiver location. What is assumed in order to produce this gain, is a high degree of oversampling of the received signal. Processing of the navigation message enables the determination of the time of transmission and the satellite position at this time.

Other embodiments are within the following claims. As indicated in the incorporated patent, the implementation can be made with any form of suitable processor, including general or specific purpose processors, including processing logic, and would typically be in a system that includes memory and other associated processing. In a communications system, the implementation would typically reside in the MAC/PHY layers, and could be implemented with hardware or software logic.

What is claimed is:

1. A method comprising:

receiving, using an antenna array, a plurality of radar signals comprising target echoes from a radar beam from a pulsed radar source, the antenna array comprising a plurality of individual antenna elements;

sampling the radar signals at each antenna element;

performing, using one or more processors, a Hermetic Transform on the plurality of radar signals comprising target echoes received by the plurality of antenna elements to produce a plurality of spatially directive beams, each beam comprising signal samples over a time period that is a multiple of the pulse repetition interval of the radar source; and using the plurality of beams to identify information about an object that is a source of the target echoes.

2. The method of claim 1, further comprising:

forming a successive plurality of series of samples received at the same time as each other from the plurality of beams, wherein the successive plurality of series of samples are arranged for moving target indicator processing and comprise sets of beam signal samples each set corresponding to one pulse repetition interval in duration;

performing a Hermetic Transform with M frequency bins on corresponding time samples of signals from each PRI to provide samples from M Doppler filters; and match filtering a Doppler channel to identify echoes generated by a specific pulse.

3. The method of claim 2, wherein the forming is performed with a corner turn memory that reads in samples from each beam into rows or columns, and reads out data in columns or rows, respectively, to provide the successive plurality of series of samples received at the same time as each other from the plurality of beams.

4. The method of claim 2, wherein the match filtering is performed using a Hermetic matched filter matrix H.

5. The method of claim 4, wherein the Hermetic matched filter matrix H is a matrix such that HS=I, where I is the identity matrix, and wherein S is a matrix of P columns of data, with each column being a transform of a circularly time shifted version of samples of a replica signal.

6. The method of claim 5, wherein the match filtering includes multiplying the Hermetic matched matrix H with a matrix F, with matrix F being derived from transformed samples of complex data.

7. The method of claim 6, wherein the samples of complex data are oversampled at a rate greater than the Nyquist rate for Doppler shifts.

8. The method of claim 1, further comprising receiving a second plurality of radar signals from a second antenna array, performing Hermetic Transform beamforming on the second received radar signals to produce a second plurality of beams with samples over a time period, using the second plurality of beams in combination with the first plurality of beams to identify information about an object.

9. The method of claim 1, wherein the information identified about the object includes location and/or movement of the object.

10. The method of claim 4, further comprising receiving a second plurality of radar signals from a second antenna array, performing Hermetic Transform beamforming on the second received radar signals to produce a second plurality of beams with samples over a time period, match filtering the second plurality of beams with a Hermetic matched filter matrix H2, wherein the Hermetic matched filter matrix H2 is a matrix such that H2S2=I, where I is the identity matrix, and wherein S2 is a matrix of P columns of data, with each column being a transform of a circularly time shifted version of samples of a replica signal.

11. A method comprising:

receiving, using an antenna array, a plurality of radar signals comprising target echoes from a radar beam from a pulsed radar source, the antenna array comprising a plurality of individual antenna elements;

sampling the radar signals at each antenna element;

providing the plurality of radar signals comprising target echoes received by the plurality of antenna elements to a Hermetic Transform to produce a plurality of spatially directive beams, each beam comprising signal samples over a time period that is a multiple of the pulse repetition interval of the radar source;

forming, using one or more processors, a successive plurality of series of samples received at the same time as each other from the plurality of beams, wherein the successive plurality of series of samples are arranged for moving target indicator processing and comprise sets of beam signal samples each set corresponding to one pulse repetition interval in duration;

match filtering a Doppler channel to identify echoes generated by a specific pulse, wherein the match filtering is performed using a Hermetic matched filter matrix H, wherein the match filtering includes multiplying the Hermetic matched matrix H with a matrix F, with matrix F being derived from transformed samples of complex data, and wherein the Hermetic matched filter matrix H is a matrix such that HS=I, where I is the identity matrix, and wherein S is a matrix of P columns of data, with each column being a transform of circularly time shifted version of samples of a replica signal; and using the desired pulse to identify information about an object that is a source of the target echoes.

12. The method of claim 11, wherein the forming is performed with a corner turn memory that reads in samples from each beam into rows or columns, and reads out data in columns or rows, respectively, to provide the successive plurality of series of samples received at the same time as each other from the plurality of beams.

13. The method of claim 11, wherein the samples of complex data are oversampled at a rate greater than the Nyquist rate for Doppler shifts.

14. The method of claim 11, wherein the result of the multiplication of matrix H and matrix F results in a matrix V that is compared to a threshold to identify one or more peak locations.

15. The method of claim 11, wherein the information about the object includes location and/or movement of the object.

16. The method of claim 11, wherein the plurality of radar signals from the antenna array is a first plurality from a first array, further comprising receiving, using a second antenna array, a second plurality of radar signals comprising second target echoes from a second radar beam from a second pulsed radar source, the second antenna array comprising a second plurality of individual antenna elements, sampling the second radar signals at each second antenna element;

providing the second plurality of radar signals comprising second target echoes received by the second plurality of antenna elements to a second Hermetic Transform to produce a second plurality of spatially directive beams, each second beam comprising signal samples over a second time period that is a multiple of the pulse repetition interval of the second radar source;

forming, using the one or more processors, a second successive plurality of series of samples received at the same time as each other from the plurality of beams, wherein the second successive plurality of series of samples are arranged for moving target indicator processing and comprise sets of beam signal samples each set corresponding to one pulse repetition interval in duration;

match filtering a second Doppler channel to identify second echoes generated by a second specific pulse, wherein the match filtering is performed using a Hermetic matched filter matrix H2, wherein the match filtering includes multiplying the Hermetic matched matrix H2 with a matrix F2, with matrix F2 being derived from transformed samples of complex data, and wherein the Hermetic matched filter matrix H2 is a matrix such that H2S2=I, where I is the identity matrix, and wherein S2 is a matrix of P columns of data, with each column being a transform of circularly time shifted version of samples of a replica signal; and using the desired pulse to identify information about an object that is a source of the second target echoes.

17. The method of claim 6, wherein the result of the multiplication of matrix H and matrix F results in a matrix V that is compared to a threshold to identify one or more peak locations.

* * * * *